Sept. 24, 1968       M. L. HAUPTMAN       3,402,574
SLIDING DRIVE MECHANISM
Filed March 16, 1966
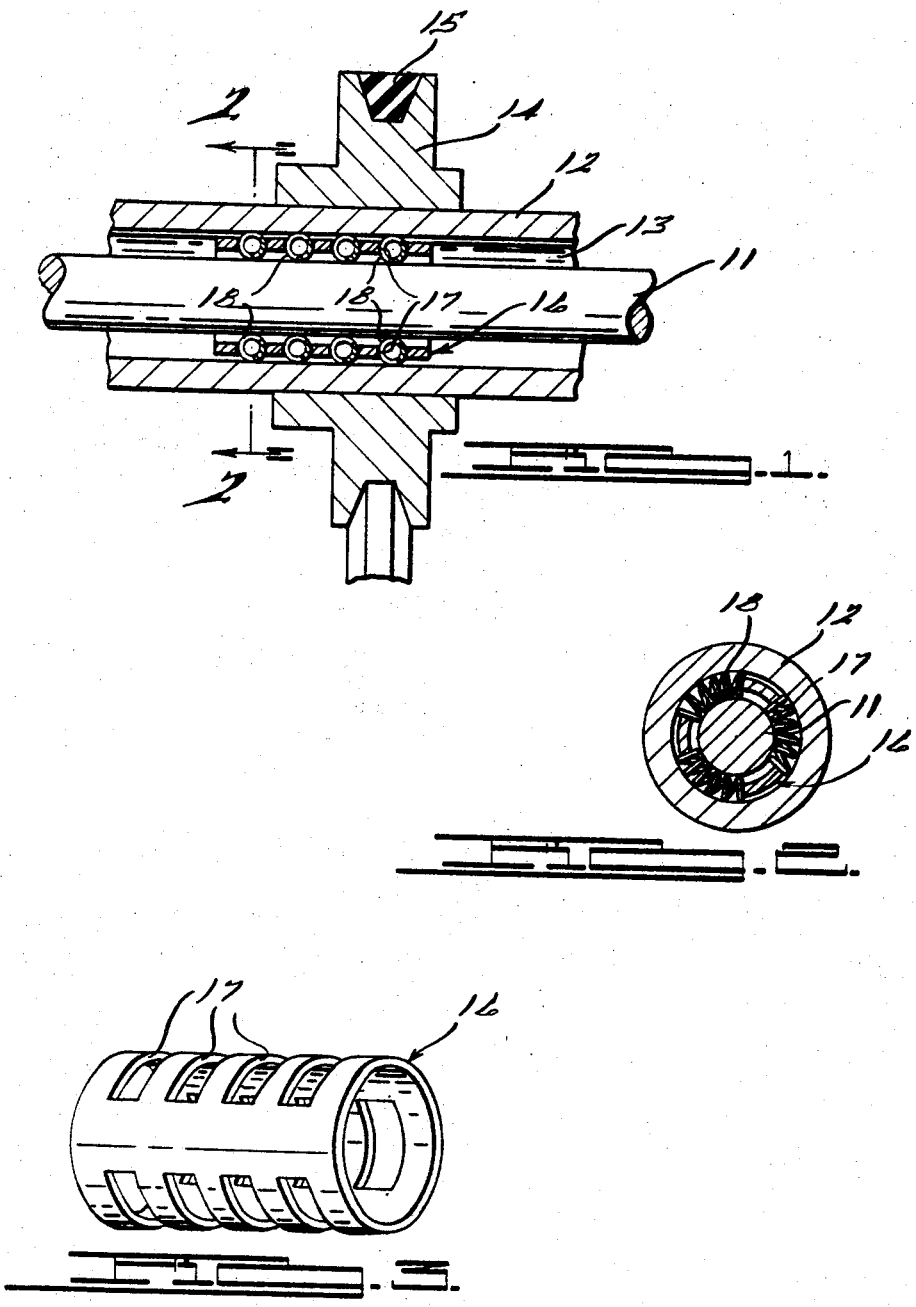
INVENTOR.
Murray L. Hauptman
BY
Harness, Dickey & Pierce
ATTORNEYS

United States Patent Office 3,402,574
Patented Sept. 24, 1968

3,402,574
SLIDING DRIVE MECHANISM
Murray L. Hauptman, 24501 Harding,
Oak Park, Mich. 48237
Filed Mar. 16, 1966, Ser. No. 534,818
2 Claims. (Cl. 64—30)

ABSTRACT OF THE DISCLOSURE

A shaft, a sleeve, a cage between them, and circumferentially extending helical spring rollers carried by the cage and pressed between the shaft and sleeve to transmit rotary driving forces but permit axial shifting.

---

This invention relates to sliding drive mechanisms and more particularly to devices for driving a shaft in a rotary direction and yet permitting the shaft to slide freely in an axial direction through the driving member in the manner of a keyed or splined connection.

It is an object of the invention to provide a novel and improved sliding drive mechanism for a shaft which is of simple yet reliable construction, is capable of transmitting relatively high rotational loads, and yet allows free movement of the shaft in an axial direction.

Other objects, features, and advantages of the present invention will become apparent from the subsequent description, taken in conjunction with the accompanying drawings.

In the drawings:

FIGURE 1 is a cross-sectional view in elevation of the sliding drive mechanism of this invention;

FIG. 2 is a cross-sectional view taken along the line 2—2 of FIGURE 1; and

FIG. 3 is a perspective view of the cage showing the slots formed therein.

Briefly, the illustrated embodiment of the invention comprises a sleeve carrying a drive pulley, the sleeve surrounding the driven shaft and being spaced outwardly therefrom. An annular cage is disposed in the space between the shaft and sleeve, the cage being spaced from both the shaft and sleeve and being formed with a plurality of circumferentially extending slots. Helically wound springs are disposed within these slots, the unstressed diameter of these springs being slightly greater than the space between the sleeve and shaft so that when inserted in this space they have a tight fit. The springs will thus conform to the annular space and will be capable of transmitting rotational forces exerted by the sleeve to the shaft. At the same time, the shaft may slide freely back and forth in an axial direction, the springs rolling between the shaft and sleeve during such axial movement.

Referring more particularly to the drawings, the shaft is indicated at 11 and the annular sleeve at 12, the space between them being indicated at 13. The sleeve is coaxial with the shaft and has a driving pulley 14 mounted thereon which may be driven by a belt 15.

A cage is generally indicated at 16 and comprises an annular member of cylindrical shape disposed in space 13. Cage 16 is substantially shorter than sleeve 12 to permit axial travel of the cage, as later described. The thickness of the wall of cage 16 is substantially less than the radial size of space 13 so that it will fit loosely therein. The cage is provided with a plurality of circumferentially extending slots 17 which pass therethrough. Three axially extending rows of slots 17 are shown in the figures, each row being separated from the adjacent rows by the material of the sleeve.

A plurality of rollers in the form of helically wound springs 18 are disposed within slots 17, as seen in FIGURES 1 and 2. These springs are flexible so that they will easily conform to the annular space 13 between shaft 11 and sleeve 12. The unstressed diameter of springs 18 is slightly larger than the radial size of space 13, so that the springs will fit tightly therein. However, the width of slots 17 is greater than the spring diameter so that little friction will be created when the springs roll on their axes within the slots.

The opposite ends of spring rollers 18 will be smoothly formed so as to encounter minimum frictional resistance with respect to the ends of slots 17, and will occupy substantially the entire lengths of the slots.

In operation, the friction between spring rollers 18 and the facing surfaces of shaft 11 and sleeve 12 is much greater in the direction of rotation of the shaft and sleeve than in an axial direction. Thus, rotation of pulley 14 in either direction will cause rotation of shaft 11 in the same direction. However, when sleeve 12 is held stationary, shaft 11 may slide back and forth axially with very little resistance, spring rollers 18 maintaining the concentricity of the shaft and sleeve during such axial movement.

A sliding drive mechanism is thus provided which presents primarily rolling friction rather than sliding friction during axial movement of the shaft, and yet is capable of transmitting relatively high rotational forces between the driving and the driven members.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:

1. In a sliding drive mechanism, a rotatable shaft member, a sleeve member surrounding said shaft member and spaced outwardly therefrom, an annular cylindical cage disposed between and spaced from both said members, a plurality of axially spaced rows of slots along the extent of said cage, each row comprising a plurality of spaced slots extending circumferentially around said cage, and helically wound spring rollers disposed within said slots and engaging the facing surfaces of said shaft and sleeve, the unstressed diameter of said spring rollers being slightly greater than the radial size of the space between said shaft and sleeve members, whereby said spring rollers will offer high frictional resistance with respect to both said members in a rotational direction but relatively low frictional resistance in an axial direction.

2. The combination according to claim 1, said springs occupying substantially the entire length of said slots but being free to rotate on their axes within said slots.

References Cited

UNITED STATES PATENTS

| | | | |
|---|---|---|---|
| 2,198,039 | 4/1940 | Onions | 308—6 |
| 2,965,734 | 12/1960 | Timmerman | 308—4 X |
| 2,975,254 | 3/1961 | Yanagisaawa | 308—4 X |
| 3,007,668 | 11/1961 | Dall | 248—425 |
| 3,081,639 | 3/1963 | Hauptman | 308—6 X |
| 3,120,371 | 2/1964 | Dall | 308—6 X |
| 3,237,471 | 3/1966 | Wunsch | 308—3 X |

EDGAR W. GEOGHEGAN, *Primary Examiner.*

L. L. JOHNSON, *Assistant Examiner.*